United States Patent
Boxiner et al.

(10) Patent No.: US 10,645,074 B2
(45) Date of Patent: May 5, 2020

(54) ACCOUNT TAKE OVER PREVENTION

(71) Applicant: CHECK POINT SOFTWARE TECHNOLOGIES LTD., Tel Aviv (IL)

(72) Inventors: Alon Boxiner, Maale Adummim (IL); Liad Mizrachi, Petah-Tikva (IL); Oded Vanunu, Rishon Le-Zion (IL); Roman Zaikin, Ashkelon (IL); Yoav Shay Daniely, Kfar Saba (IL)

(73) Assignee: CHECK POINT SOFTWARE TECHNOLOGIES LTD., Tel Aviv (IL)

( * ) Notice: Subject to any disclaimer, the term of this patent is extended or adjusted under 35 U.S.C. 154(b) by 69 days.

(21) Appl. No.: 15/470,951

(22) Filed: Mar. 28, 2017

(65) Prior Publication Data
US 2018/0288032 A1    Oct. 4, 2018

(51) Int. Cl.
    *H04L 29/00*    (2006.01)
    *H04L 29/06*    (2006.01)
    *H04L 9/32*     (2006.01)

(52) U.S. Cl.
    CPC ........ *H04L 63/0823* (2013.01); *H04L 9/3268* (2013.01)

(58) Field of Classification Search
    CPC ... H04L 63/0823; H04L 9/3263; H04L 63/08; H04L 63/0815; H04L 63/10
    See application file for complete search history.

(56) References Cited

U.S. PATENT DOCUMENTS

| | | | | |
|---|---|---|---|---|
| 2009/0132812 | A1* | 5/2009 | Kobozev | H04L 9/3263 713/156 |
| 2014/0189808 | A1* | 7/2014 | Mahaffey | H04L 63/083 726/4 |
| 2014/0289511 | A1* | 9/2014 | Tuch | H04L 63/0823 713/156 |
| 2015/0319252 | A1* | 11/2015 | Momchilov | H04L 67/141 709/223 |

* cited by examiner

*Primary Examiner* — Jeffrey C Pwu
*Assistant Examiner* — Helai Salehi
(74) *Attorney, Agent, or Firm* — Mark M. Friedman

(57) ABSTRACT

A method for monitoring access of users to Internet SaaS applications includes the CISO (company Internet security office) in the configuration and operation of the method, instead of relying only on whatever security the SaaS application implements. Certificates, not accessible to users, are pushed to a user's client. When an access request is received from a client by an application, a gateway requests from the client the certificate. After a notification and approval process with the user, a received certificate is verified, user access to the application is allowed or denied, and the CISO notified of the attempted access.

17 Claims, 3 Drawing Sheets

ACCOUNT TAKE OVER PREVENTION

FIELD OF THE INVENTION

The present invention generally relates to monitoring access, and in particular, it concerns verification of user access to applications.

BACKGROUND OF THE INVENTION

Account takeover is a form of identity theft in which an attacker obtains an individual's personal information (such as password, user name, or mail address). Using this personal information, the attacker achieves access to a victim's account and can use the account without user's concern. In addition, the attacker might change the account information (such as password) to prevent the user logging into his account.

Today, most companies work in the cloud (Internet cloud computing). Working in the cloud can mean that all of the user's personal data is stored in cloud services, including documents, bank account information, sensitive business logic information, etc. A popular cloud-based implementation is software as a service (SaaS). Using SaaS, users communicate directly with applications implemented as software deployed on cloud hardware.

According to Check Point's incident report statistics, in the 4th quarter of 2015, 53% of all incidents have occurred in the cloud. 38% of these incidents were account takeovers. These incidents are generally recorded events, that are security related, seen in the "wild" (on the public Internet), of customers that were attacked during this period.

SUMMARY

According to the teachings of the present embodiment there is provided a method for monitoring access, including the steps of: sending a certificate to a client; receiving a notice of an access request by a client; requesting the certificate from the client, the request based on the notice of the access request; receiving a second certificate from the client; verifying if the second certificate matches the certificate; sending a notification based on the results of the verifying.

In an optional embodiment, sending a certificate is preceded by sending a request for the certificate from a mobile device management (MDM) module to a verification server and receiving the certificate from the verification server by the MDM module. In another optional embodiment, sending a certificate is from a mobile device management (MDM) module to a client. In another optional embodiment, the certificate is an encrypted certificate. In another optional embodiment, receiving a notice is preceded by the client requesting access to an application; and the application sending the notice of the access request to a gateway. In another optional embodiment, the application is a software as a service (SaaS) application. In another optional embodiment, the requesting the certificate is from a gateway. In another optional embodiment, requesting the certificate includes a function selected from the group consisting of: initiating a notification on the client of the access request; initiating a notification on a verification device of the client, of the access request; requesting from a user of the client, approval of the access request; and requesting from a user of the client, approval to send the certificate from the client. In another optional embodiment, receiving a second certificate is to a gateway. In another optional embodiment, verifying includes: sending the second certificate from a gateway to a verification server; the verification server including a copy of the certificate; determining, by the verification server, if the second certificate matches the certificate; and sending, by the verification server, results of the determining to the gateway. In another optional embodiment, sending a notification is from a gateway to an application.

According to the teachings of the present embodiment there is provided a system including: a processing system containing one or more processors, the processing system being configured to: send a certificate to a client; receive a notice of an access request by a client; request the certificate from the client, the request based on the notice of the access request; receive a second certificate from the client; verify if the second certificate matches the certificate; send a notification based on the results of the verifying.

In an optional embodiment, the certificate is sent from a mobile device management (MDM) module to the client; the notice is received by a gateway from an application; the certificate is requested by the gateway from the client; the second certificate is received by the gateway from the client; the match of the second certificate to the certificate is by a verification server; and the notification is sent from the gateway to the application.

According to the teachings of the present embodiment there is provided a non-transitory computer-readable storage medium having embedded thereon computer-readable code for monitoring access, the computer-readable code including program code for: sending a certificate to a client; receiving a notice of an access request by a client; requesting the certificate from the client, the request based on the notice of the access request; receiving a second certificate from the client; verifying if the second certificate matches the certificate; sending a notification based on the results of the verifying.

In an optional embodiment, further including program code wherein the sending a certificate is preceded by sending a request for the certificate from a mobile device management (MDM) module to a verification server and receiving the certificate from the verification server by the MDM module. In another optional embodiment, further including program code wherein the receiving a notice is preceded by: the client requesting access to an application; and the application sending the notice of the access request to a gateway. In another optional embodiment, further including program code wherein the requesting the certificate includes a function selected from the group consisting of initiating a notification on the client of the access request; initiating a notification on a verification device of the client, of the access request; requesting from a user of the client, approval of the access request; and requesting from a user of the client, approval to send the certificate from the client. In another optional embodiment, further including program code wherein the verifying includes: sending the second certificate from a gateway to a verification server; the verification server including a copy of the certificate; determining, by the verification server, if the second certificate matches the certificate; and sending, by the verification server, results of the determining to the gateway.

BRIEF DESCRIPTION OF FIGURES

The embodiment is herein described, by way of example only, with reference to the accompanying drawings, wherein.

ABBREVIATIONS AND DEFINITIONS

For convenience of reference, this section contains a brief list of abbreviations, acronyms, and short definitions used in this document. This section should not be considered limiting. Fuller descriptions can be found below, and in the applicable Standards.

API—Application programming interface.

Certificate Digital certificate—Electronic credentials that are used to certify the identities of individuals, computers, and other entities on a network.

CISO—Company Internet security office. Responsible for setting and/or implementing computer security policy, monitoring computer/network security, and taking action as necessary to prevent, mitigate, and analyze security threats.

Credentials Information used to certify the identities of individuals, computers, and other entities on a network. Credentials are evidence that a communicating party possesses that can be used to verify who the party is and whether the party has permission to access the resources to which the party is requesting access.

Incident—A recorded event of a security related matter.

IT—Information technology.

Keybag—A location on a device, generally a secure part of the operating system of the device, where encryption keys, certificates, and similar security tokens are stored. The keybag is not accessible to general users (such as a user of the device), only accessible to privileged accounts and authorized applications. These security tokens are normally stored encrypted.

MDM—Mobile device management. Security software used by an IT department to monitor, manage and secure employees' mobile devices that are deployed, for example across multiple mobile service providers and across multiple mobile operating systems.

SaaS—Software as a service. A third-party provider hosts SaaS applications and makes the applications available to customers over the Internet. SaaS is one of three main categories of cloud computing.

SOC—Security operations center. A facility where company and/or enterprise information systems are monitored, assessed, and defended.

Figure 1:
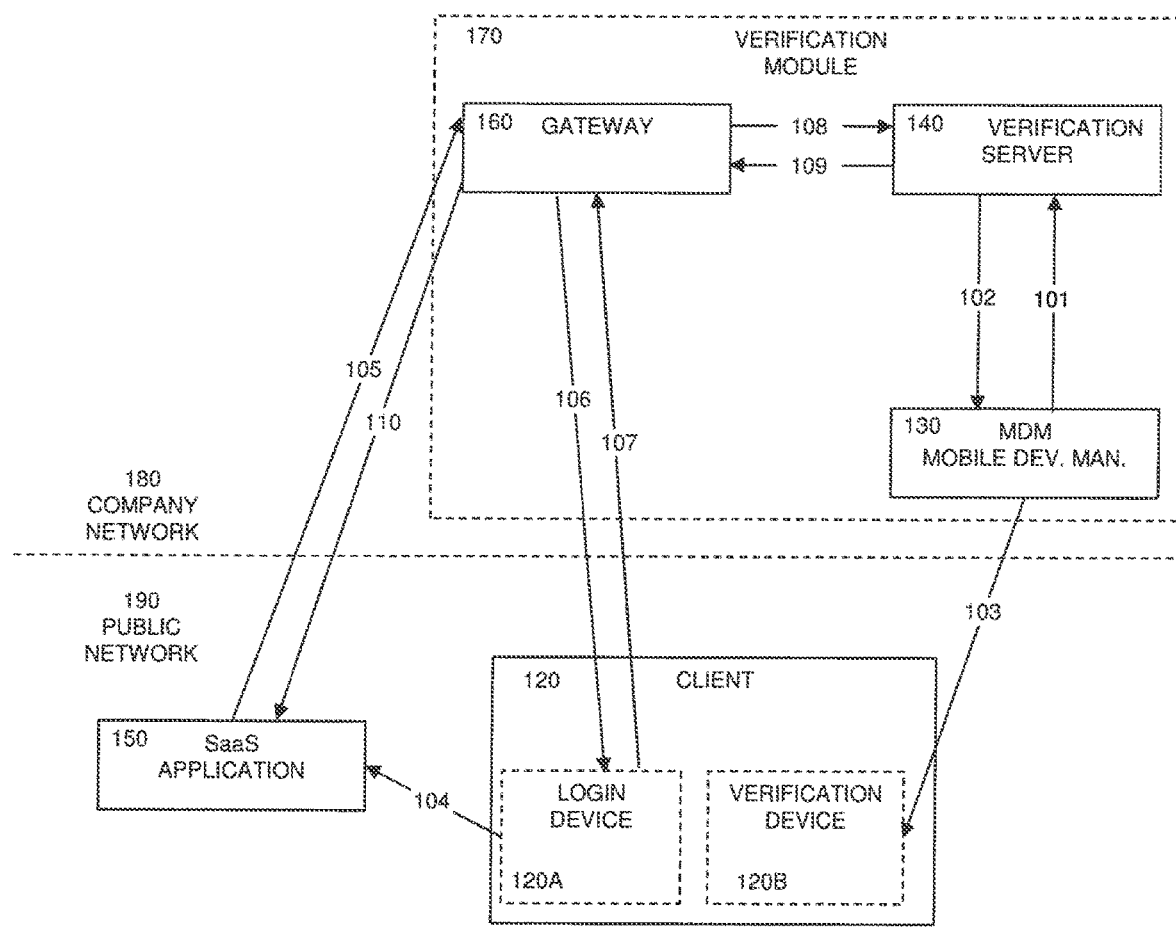
FIG. 1 is a system for monitoring access.
Figure 2:
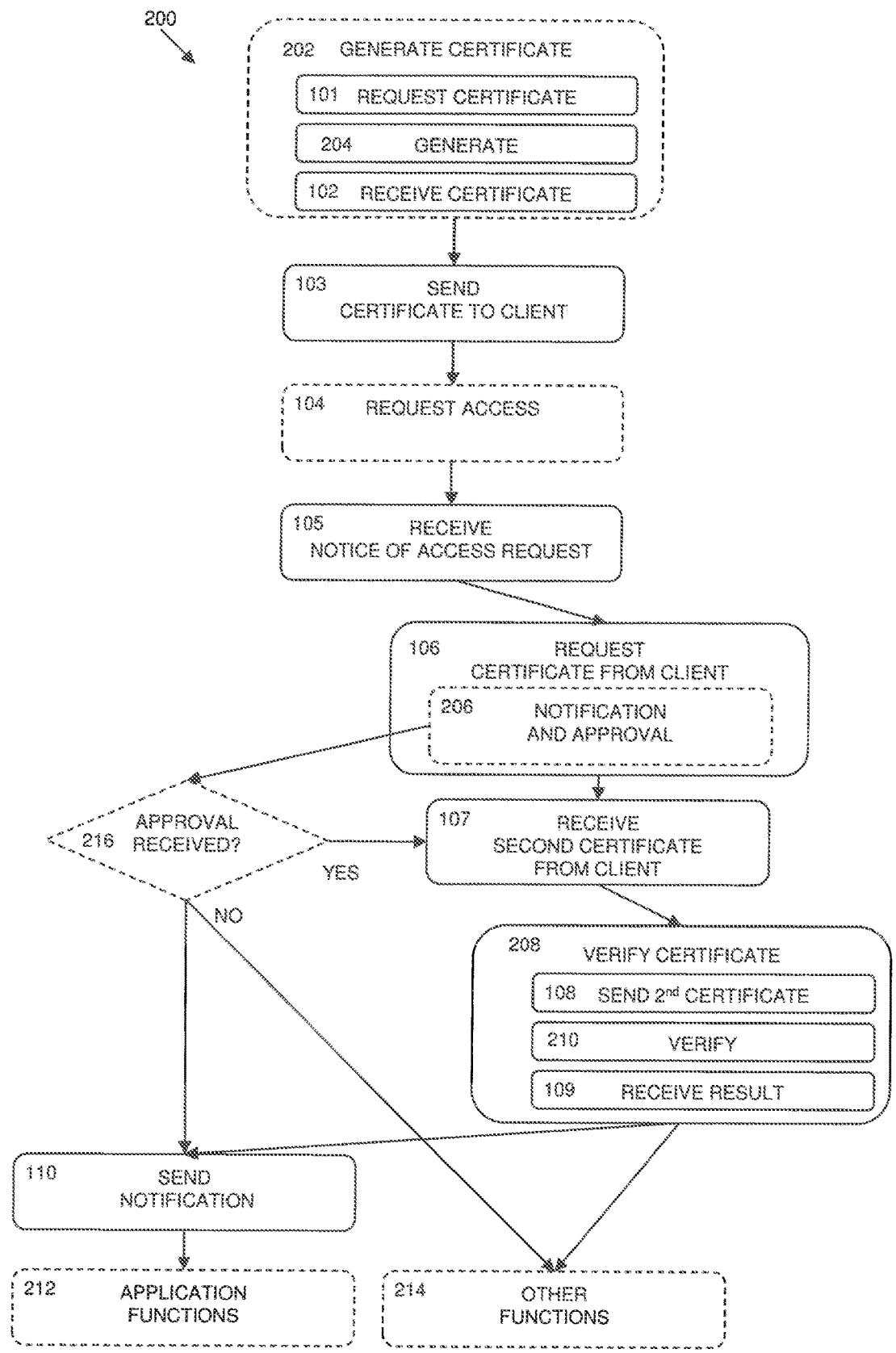
FIG. 2 is a method for monitoring access.
Figure 3:
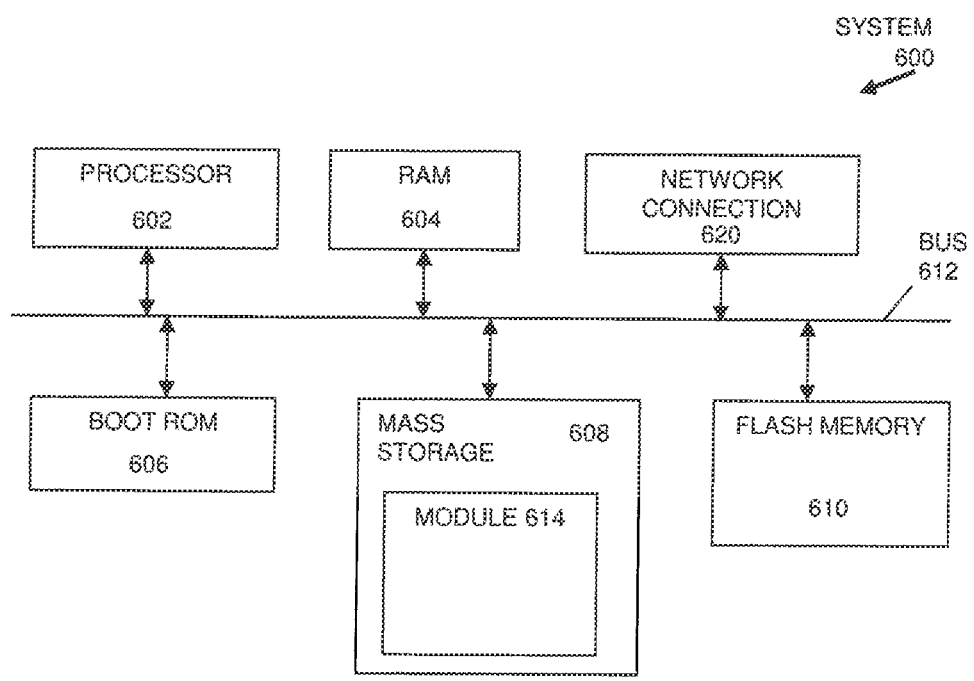
FIG. 3 is a high-level partial block diagram of an exemplary system.

Detailed Description—First Embodiment—FIGS. 1 to 3

The principles and operation of the method and system according to a present embodiment may be better understood with reference to the drawings and the accompanying description. A present invention is a method and system for monitoring access. The system facilitates verification of user requests for access, and in particular is useful for preventing account takeover. The system facilitates visibility of the usage of an application, in particular Internet software as a service (SaaS) applications. Multiple, innovative layers of protection are added to conventional SaaS application authentication process, to provide monitoring and improved security (cyber security) of access to SaaS applications.

A method for monitoring access of users to Internet SaaS applications includes the CISO (company Internet security office) in the configuration and operation of the method, instead of relying only on whatever security the SaaS application implements. Certificates, not accessible to users, are pushed to a user's client. When an access request is received from a client by an application, a gateway requests from the client the certificate. After a notification and approval process with the user, a received certificate is verified, user access to the application is allowed or denied, and the CISO notified of the attempted access.

While portions of the present embodiment may exist in conventional techniques, the synergistic combination described in this document provides an innovative solution for the field. The cyber security provided by the present embodiment is an improvement to the functioning of the computers, networks, and company security themselves.

Referring now to the drawings, FIG. 1 is a system for monitoring access. A client 120 is pre-configured by a mobile device management module (MDM 130) with a certificate. The certificate is generated by a verification server module 140 that provides the certificate to the MDM 130. The client 120 is on a public network 190, and desires access to an application module 150 (shown as an SaaS application) on the public network 190. The application 150 is in communication with a gateway module 160. The gateway 160 communicates with the client 120 and with the verification server 140. One or more of the gateways 160, verification server 140, and MDM 130 modules can be combined and implemented as a verification module 170. Note that for clarity the unidirectional (one-sided) arrows in the current figure refer to the primary direction of interaction, however one skilled in the art will realize that actual implementation of interaction is generally bi-directional.

The client 120 can be implemented as one or more devices. For example, the client 120 can be implemented as a logon device 120A and a verification device 120B. Logon devices 120A include a home computer and laptop. Examples of the verification device 120B include another computer (other than the logon device 120A) and a phone. A typical implementation of the client 120 is a Smartphone. However, this exemplary implementation is not limiting. For clarity in this document, generally references are to the client 120, however, based on this description one skilled in the art will be able to implement the client module functionality on one or more devices.

The client 120 is typically implemented (deployed and used) on a public network 190, for example on the Internet, while the application 150, gateway 160, verification server 140, and MDM 130 are typically implemented on private networks, such as a company network 180. This configuration is not limiting, and one or more modules may be deployed on either the public 190 or company 180 networks. For example, the gateway 160 can be on both the public network 190 and the company network 180. Similarly, the client 120 can be used on the public 190 or company 180 networks.

The current figure shows a typical configuration of the gateway module 160, the verification server module 140, and the MDM module 130 being each deployed as a separate module, typically as individual hardware in various locations on the company's network 180. Alternatively, one or more modules can be combined. For example, the verification server 140 and MDM 130 can be implemented on the same computer. In another example, a stand-alone gateway 160 is not used, instead the functions performed by the gateway 160 are performed by the verification server 140.

Refer now also to the drawings, FIG. 2, a method for monitoring access. The method is generally implemented by the verification module 170. For clarity in this description, specific modules (sub modules) of the verification module will be used to describe implementation. For clarity in the current figure, dashed boxes are used to show additional blocks (method steps) that are, or can, be performed by modules other than the verification module 170.

A method for monitoring access 200 begins by acquiring a certificate. In the context of this document, the term "certificate" (including the term "second certificate") generally refers to a digital certificate, electronic credentials that are used to certify the identities of individuals, computers, and other entities on a network. In particular, certifying the identity of a user via a client 120 to access an application 150. The certificates are preferably encrypted at all times, including during storage and transmission, with decryption only by the verification server 140 during the verification process. For simplicity in this description, the term "certificate" is used in place of "encrypted certificate".

When a new device, represented by the client 120, is added as an authorized user of a company's applications (such as SaaS application 150), the Company Internet Security Office (CISO) needs to generate a certificate 202 for the client 120. Company policy can determine specific requirements and configurations, such as whether a single certificate per user is deployed to one or more user devices, or each device must have a certificate. For clarity in this document, a single certificate is used with a single client. Based on this description, one skilled in the art will be able to implement other configurations.

The mobile device management module (MDM 130) sends a request for a certificate 101 to the verification server 140. The request for a certificate 101 is received by the verification server 140. Then the verification server 140 generates 204 a certificate (and encrypts the certificate), and sends the (encrypted) certificate to the MDM 130. A copy of the (original) certificate is retained (encrypted) on the verification server 140. The MDM 130 receives the certificate 102, and sends the certificate 103 to the client 120. The client 120 receives the certificate and typically installs the certificate in a keybag. The keybag is a secure location on a device, inaccessible to the user of the client 120. A feature of the present embodiment is that a user of the client 120 does not have access or interaction with the certificate, that is, the certificate is inaccessible during all steps of the method, including setup (configuration, pre-configuration) and operation (monitoring). Certificate installation and use is independent of direct user interaction with the certificate. Generally, the certificate is pushed from the MDM 130 to the client 120. With the certificate installed on the client 120, the client is now pre-configured with a certificate. Pre-configuring refers to configuring the client 120 before the client requests access 104 to the application 150. Pre-configuring generally includes setting up the client 120 with applications and data so that the MDM 130 will allow the client. 120 access to the SaaS application 150.

A user, via the client 120, desires access to the application 150, and sends a request for access 104 from the client to the application 150. Typically, the request for access is a login request including user credentials, such as username and password. As described above, the login can be from the client 120 or from the login device 120A associated with the client 120.

The application receives the request for access 104, and in response sends a notice of access request 105 to the gateway 160. This notice of access request 105 lets the gateway 160 know that an access request (login attempt) has been made. A preferred embodiment is to use the application's 150 existing application programming interface (API) for communication with the verification module 170, typically with the gateway 160.

The gateway 160 receives the notice of access request 105, and in response initiates a verification check to attempt to verify the user. To verify the user, the gateway 160 sends a request for a certificate 106 to the client. The request for a certificate 106 is based on the notice of access request 105, which in turn sends a notification to the registered user and asks for an approval.

The client 120 receives the request for a certificate 106 from the gateway 160, and responds by sending a (encrypted) second certificate to the gateway 160. Note that the use of the term "second certificate" is used in this description for clarity, as the certificate returned by the client 120 may or may not be the originally pre-configured certificate. In a case where the request for access 104 is from a legitimate user of the client 120, the second certificate will be the same as (a copy of) the first certificate. However, in a case where the request for access is not legitimate, such as an attempt at account takeover, the client 120 may not be able to return the (original, valid) certificate. The client 120 may return a certificate (second certificate) different from the (original) certificate, or may not return any certificate, thus the second certificate is null.

Preferably, after the client 120 (verification device 120B) receives the request for a certificate 106, at least one notification and approval process 206 is executed on the client 120. Depending on the company's security policy for the company network 180 and the MDM 130 requirements and implementation, a variety of notifications and approvals 206 can be executed. Notifications can include initiating a notification of the access request, such as a pop-up on the user's phone. Preferably, a notification is issued on the user's verification device 120B for any and all attempted accesses using any of the user's credentials. For example, in an attempted account takeover, the request for access 104 may not come from the user's mobile phone (client 120, login device 120A), but from another device on the public network 190 or the company network 180. In this case, the user will be notified that the user's credentials (such as username and password) are being used to attempt access. In another example, the user's phone has been stolen, thus the notification appears on the verification device 120B.

The notification is preferably a request to the user, requesting approval of the request for access 104. This request to the user for approval is also known as a "challenge". For example, the user may have to tap (press) "OK" on the user's cell phone screen to approve the challenge and allow the method to continue with sending the second certificate. More preferably, the challenge requires the user to supply something the user knows or has, to help insure that the user, and not someone else, is approving the request. For example, the user may have to respond to the challenge by typing a password or giving a fingerprint.

If approval from the user is received 216, then the client 120 sends the second certificate from the client 120 to the gateway 160 (figure block 216 to block 107). If approval from the user is not received, then verifying the certificate 208 will not be performed. Failure to receive approval from the user can result in the gateway 160 sending a notification 110 to the application 150, specifically that the verification check has failed (figure block 216 to block 110). Alternatively, or preferably in addition, failure to receive approval 216 can be used to trigger other functions 214 (described below).

The gateway 160 receives the second certificate 107 from the client 120. The gateway 160 verifies 208 if the second certificate matches the certificate. Verifying the certificate 208 can include the gateway 160 sending the second certificate 108 to the verification server 140. The verification server 140 receives the second certificate from the gateway 160 and verifies 210 if the second certificate matches the certificate held by the verification server 140. Verification on the verification server 140 typically includes decrypting both the second certificate and the certificate, in order to determine if the certificates match. After the verification server 140 determines if the second certificate matches the certificate, the verification server 140 sends a result of the verification to the gateway 160.

The gateway 160 receives the result of the verification 109 from the verification server 140. Based on the received result of verifying, the gateway sends a notification 110 to the application 150. The notification can be used to trigger application functions 212. In a case where the second certificate matches the certificate, the notification can be used by the application 150 to allow the client 120 access to the application 150. The login process has been accomplished, and the user can login. In a case where the second certificate does not match the certificate, the notification 110 can be used as a trigger for one or more application functions 212. The application functions 212 include the application 150 denying user login to the application. The application 150 can (implement an application function 212 to) notify the MDM 130 and or the CISO of the failed authentication, such as a possible account takeover attempt, and any other details available from the request for access. Alternatively, or preferably in addition, the results of verifying the certificate 208 can be used to trigger other functions 214. Example of other functions 214 include the gateway 160 notifying the MDM 130 and or the CISO of the failed authentication. The MDM and/or the CISO can then take actions, such as revoking the certificate, denying the user and/or client 120 access to the company network 180, shutting down any current user authentications, notifying the user, and perforating an audit of recent user activity.

A feature of the present embodiment, as described above, is to use the application's 150 existing API. This feature enables the verification module 170 at least to notify the application 150 of success or failure of monitoring access to the application 150. Depending on the scope of the API, and how much permission the application 150 wants to give the verification module 170, a variety of application functions 212 can be implemented. Application functions can be triggered by the application 150 based on the application 150 processing the received notification 110. Alternatively, the gateway 160 can use the application's API to trigger application functions 212. The extent of functions triggerable on the application 150 depends on the application's API and what the application 150 allows.

Another feature of the present embodiment is the inclusion of the CISO and/or SOC team of the organizations in the process. Monitoring access includes not only gateway 160 sending a notification 110 to the application 150, but also triggering other functions 214, such as notifying the MDM 130 and or the CISO of the failed authentication. Thus, the current method facilitates alerting and handling not available in current solutions. In contrast, conventional, current solutions are "between the application and the user", relying on the application 150 and/or the cloud to handle security between the application 150 and the client 120. The current solutions require companies to rely on the application 150 for security, while the present embodiment provides explicit links for the company to monitor access and security of the client 120 and application 150.

Another feature of the present embodiment is that the verification module 170 can be implemented independent of the application 150. The application 150 and the verification module 170 communicate using the application's API. This feature allows embodiments to be offered as a third party service, that is, the method of monitoring access and verification module 170 can be implemented for existing application providers and clients (the application 150 and the client 120). Conventional communications are between the cloud and a user, that is, directly between an application 150 and a client 120. In contrast, the present embodiment enables additional protection, using the current API's, via additional and alternative communication channels.

FIG. 3 is a high-level partial block diagram of an exemplary system 600 configured to implement the verification module 170 of the present invention. System (processing system) 600 includes a processor 602 (one or more) and four exemplary memory devices: a RAM 604, a boot ROM 606, a mass storage device (hard disk) 608, and a flash memory 610, all communicating via a common bus 612. As is known in the art, processing and memory can include any computer readable medium storing software and/or firmware and/or any hardware element(s) including but not limited to field programmable logic array (FPLA) element(s), hard-wired logic element(s), field programmable gate array (FPGA) element(s), and application-specific integrated circuit (ASIC) element(s). Any instruction set architecture may be used in processor 602 including but not limited to reduced instruction set computer (RISC) architecture and/or complex instruction set computer (CISC) architecture. A module (processing module) 614 is shown on mass storage 608, but as will be obvious to one skilled in the art, could be located on any of the memory devices.

Mass storage device 608 is a non-limiting example of a non-transitory computer-readable storage medium bearing computer-readable code for implementing the data storage methodology described herein. Other examples of such computer-readable storage media include read-only memories such as CDs bearing such code.

System 600 may have an operating system stored on the memory devices, the ROM may include boot code for the system, and the processor may be configured for executing the boot code to load the operating system to RAM 604, executing the operating system to copy computer-readable code to RAM 604 and execute the code.

Network connection 620 provides communications to and from system 600. Typically, a single network connection provides one or more links, including virtual connections, to other devices on local and/or remote networks. Alternatively, system 600 can include more than one network connection (not shown), each network connection providing one or more links to other devices and/or networks.

System 600 can be implemented as a server or client respectively connected through a network to a client or server.

Note that a variety of implementations for modules and processing are possible, depending on the application. Modules are preferably implemented in software, but can also be implemented in hardware and firmware, on a single processor or distributed processors, at one or more locations. The above-described module functions can be combined and implemented as fewer modules or separated into sub-functions and implemented as a larger number of modules. Based on the above description, one skilled in the art will be able to design an implementation for a specific application.

Note that the above-described examples, numbers used, and exemplary calculations are to assist in the description of this embodiment. Inadvertent typographical errors, mathematical errors, and/or the use of simplified calculations do not detract from the utility and basic advantages of the invention.

To the extent that the appended claims have been drafted without multiple dependencies, this has been done only to accommodate formal requirements in jurisdictions that do not allow such multiple dependencies. Note that all possible combinations of features that would be implied by rendering the claims multiply dependent are explicitly envisaged and should be considered part of the invention.

It will be appreciated that the above descriptions are intended only to serve as examples, and that many other embodiments are possible within the scope of the present invention as defined in the appended claims.

What is claimed is:

1. A method for monitoring access, comprising the steps of:
    (a) sending a certificate from a mobile device management (MDM) module to a client;
    (b) receiving at a gateway a notice from an application, said gateway other than said client,
        said notice is of an access request by said client to said application, and
        said application other than on said client and said gateway;
    (c) requesting by said gateway said certificate from said client, said request based on said notice of said access request;
    (d) receiving by said gateway a second certificate from said client;
    (e) verifying whether said second certificate matches said certificate; and
    (f) sending a notification from said gateway to said application, said notification based on the results of said verifying,
    wherein said application is a software as a service (SaaS) application.

2. The method of claim 1 wherein said sending a certificate is preceded by sending a request for said certificate from a mobile device management (MDM) module to a verification server and receiving said certificate from said verification server by said MDM module.

3. The method of claim 1 wherein said certificate is an encrypted certificate.

4. The method of claim 1 wherein said receiving a notice is preceded by:
    (i) said client requesting access to said application; and
    (ii) said application sending said notice of said access request to said gateway.

5. The method of claim 1 wherein said requesting said certificate includes a function selected from the group consisting of:
    (i) initiating a notification on said client of said access request;
    (ii) initiating a notification on a verification device of said client, of said access request;
    (iii) requesting from a user of said client, approval of said access request; and
    (iv) requesting from a user of said client, approval to send said certificate from said client.

6. The method of claim 1 wherein said verifying includes:
    (i) sending said second certificate from said gateway to a verification server;
    (ii) said verification server including a copy of said certificate;
    (iii) determining, by said verification server, whether said second certificate matches said certificate; and
    (iv) sending, by said verification server, results of said determining to said gateway.

7. The method of claim 1 wherein said verifying monitors access of said client to said application.

8. A system comprising: a processing system containing one or more processors, said processing system being configured to:
    (a) send a certificate from a mobile device management (MDM) module to a client;
    (b) receive at a gateway a notice from an application, said gateway other than said client,
        said notice is of an access request by said client to said application, and
        said application other than on said client and said gateway;
    (c) request by said gateway said certificate from said client, said request based on said notice of said access request;
    (d) receive by said gateway a second certificate from said client;
    (e) verify whether said second certificate matches said certificate; and
    (f) send a notification from said gateway to said application, said notification based on the results of said verifying,
    wherein said application is a software as a service (SaaS) application.

9. The system of claim 8 wherein:
    said match of said second certificate to said certificate is by a verification server.

10. The system of claim 8 wherein said verifying monitors access of said client to said application.

11. A non-transitory computer-readable storage medium having embedded thereon computer-readable code for monitoring access, the computer-readable code comprising program code for:
    (a) sending a certificate from a mobile device management (MDM) module to a client;
    (b) receiving at a gateway a notice from an application, said gateway other than said client,
        said notice is of an access request by said client to said application, and
        said application other than on said client and said gateway;
    (c) requesting by said gateway said certificate from said client, said request based on said notice of said access request;
    (d) receiving by said gateway a second certificate from said client;
    (e) verifying whether said second certificate matches said certificate; and
    (f) sending a notification from said gateway to said application, said notification based on the results of said verifying,
    wherein said application is a software as a service (SaaS) application.

12. The computer-readable code of claim 11 further including program code wherein said sending a certificate is preceded by sending a request for said certificate from a mobile device management (MDM) module to a verification server and receiving said certificate from said verification server by said MDM module.

13. The computer-readable code of claim 11 further including program code wherein said receiving a notice is preceded by:
    (i) said client requesting access to said application; and (ii) said application sending said notice of said access request to said gateway.

14. The computer-readable code of claim 11 further including program code wherein said requesting said certificate includes a function selected from the group consisting of:
   (i) initiating a notification on said client of said access request;
   (ii) initiating a notification on a verification device of said client, of said access request;
   (iii) requesting from a user of said client, approval of said access request; and
   (iv) requesting from a user of said client, approval to send said certificate from said client.

15. The computer-readable code of claim 11 further including program code wherein said verifying includes:
   (i) sending said second certificate from said gateway to a verification server;
   (ii) said verification server including a copy of said certificate;
   (iii) determining, by said verification server, whether said second certificate matches said certificate; and
   (iv) sending, by said verification server, results of said determining to said gateway.

16. A method for monitoring access, comprising the steps of: on a client:
   (a) receiving a certificate from a mobile device management (MDM) module;
   (b) sending an access request to an application;
   (c) receiving a request from a gateway for said certificate, said request based on a notice from said application, said notice in response to said access request, said gateway other than said client, and said application other than on said client and said gateway;
   (d) sending a second certificate to said gateway; and
   (e) receiving or being denied access to said application based on said application receiving a notification from said gateway,
      said notification based on the results of verifying whether said second certificate matches said certificate,
   wherein said application is a software as a service (SaaS) application.

17. A method for monitoring access, comprising the steps of: on a verification server:
   (a) sending a certificate to a mobile device management (MDM) module;
   (b) receiving a second certificate from a gateway;
      said second certificate sent from a client to said gateway,
      said gateway previously requesting said certificate from said client,
      said requesting based on a notice from an application to said gateway,
      said notice of an access request by said client to said application,
      said application other than on said client and said gateway,
      said gateway other than said client, and
      said certificate having been sent from said MDM to said client,
   (c) verifying whether said second certificate matches said certificate; and
   (f) sending a notification to said gateway, said notification based on the results of said verifying,
   wherein said application is a software as a service (SaaS) application.

* * * * *